(12) United States Patent
Mummadi et al.

(10) Patent No.: US 11,055,632 B2
(45) Date of Patent: Jul. 6, 2021

(54) METHOD AND DEVICE FOR IMPROVING THE ROBUSTNESS AGAINST "ADVERSARIAL EXAMPLES"

(71) Applicant: Robert Bosch GmbH, Stuttgart (DE)

(72) Inventors: Chaithanya Kumar Mummadi, Heimsheim (DE); Jan Hendrik Metzen, Boeblingen (DE); Volker Fischer, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 674 days.

(21) Appl. No.: 15/948,722

(22) Filed: Apr. 9, 2018

(65) Prior Publication Data

US 2018/0308012 A1    Oct. 25, 2018

(30) Foreign Application Priority Data

Apr. 19, 2017   (DE) .......................... 102017206555.9
Jan. 17, 2018   (DE) .......................... 102018200724.1

(51) Int. Cl.
| | | |
|---|---|---|
| G06N 20/00 | (2019.01) | |
| G06N 3/00 | (2006.01) | |
| G06N 3/04 | (2006.01) | |
| G06N 3/08 | (2006.01) | |
| G05B 15/02 | (2006.01) | |

(52) U.S. Cl.
CPC ............. *G06N 20/00* (2019.01); *G05B 15/02* (2013.01); *G06N 3/008* (2013.01); *G06N 3/0454* (2013.01); *G06N 3/0472* (2013.01); *G06N 3/08* (2013.01); *G06N 3/084* (2013.01)

(58) Field of Classification Search
CPC ...... G06N 20/00; G06N 3/008; G06N 3/0454; G06N 3/0472; G06N 3/08; G06N 3/084; G05B 15/02
USPC ...................................................... 706/12–44
See application file for complete search history.

(56) References Cited

FOREIGN PATENT DOCUMENTS

DE         102005050577 A1      5/2007

OTHER PUBLICATIONS

Xie, Cihang; Wang, Jianyu; Zhang, Zhishuai; Zhou, Yuyin; Xie, Lingxi; Yuille Alan, "Adversarial Examples for Semantic Segmentation and Object Detection," Mar. 24, 2017, 2017 IEEE International Conference on Computer Vision (ICCV), V1 (Year: 2017).*
Balujia, et al.: "Adversarial Transfomation Networks: Learning to Generate Adversarial Examples", Computing Research Repository (CoRR), (2017), https://arxiv.org/abs/1703.09387v1, pp. 1-13.

(Continued)

*Primary Examiner* — Jonathan Han
(74) *Attorney, Agent, or Firm* — Norton Rose Fulbright US LLP; Gerard Messina

(57) ABSTRACT

A method for generating a universal data signal interference for generating a manipulated data signal for deceiving a first machine learning system, which is configured to ascertain a semantic segmentation of a received one-dimensional or multidimensional data signal, The method includes a) ascertaining a training data set that includes pairs of data signals and associated desired semantic segmentations, b) generating the data signal interference, as a function of the data signals of the training data set, of the associated desired semantic segmentation, as well as of estimated semantic segmentations of the data signals acted upon by the data signal interference.

17 Claims, 7 Drawing Sheets

(56) References Cited

OTHER PUBLICATIONS

Fischer, et al.: "Adversarial Examples for Semantic Image Segmentation", Workshop track—ICLR (2017), arXiv eprints, pp. 1-4.
Gavves, Efstratios: Lecture 9 "Unsupervised, Generative & Adversarial Networks", UVA Deep Learning Course, University oif Amsterdam (2016), https://github.com/ivadlc/uvadlc.github.io/blob/master/lectures/lecture9.pdf.
Kurakin, et al.: "Adversarial Examples in the Physical World", Workshop track—ICLR 2017, Computing Research Repository (CoRR), (2017), pp. 1-14, https://arxiv.org/abs/1607.02533v4.
Li, et al.: Lecture 9: "Understanding and Visualizing Convolutional Neural Networks", (2016), Convolutional Neural Networks for Visual Recognition, Stanford University, https://cs231n.stanford.edu/slides/2016/winter1516_lecture9.pdf.
Lu, et al.: "No Need to Worry about Adversarial Examples in Object Detection in Autonomous Vehicles", arXiv e-prints (2017), pp. 1-9.
Moosavi-Dezfooli, et al.:"Universal adversarial perturbations", Computing Research Repository (CoRR) (2017), pp. 1-11, https://arxiv.org/abs/1610.08401v3.
Xie, et al.: "Adversarial Examples for Semantic Segmentation and Object Detection", Computing Research Repository (CoRR) (2017), pp. 1-12, htpps://arxiv.org/abs/1703.08603v2.

\* cited by examiner

METHOD AND DEVICE FOR IMPROVING THE ROBUSTNESS AGAINST "ADVERSARIAL EXAMPLES"

CROSS REFERENCE

The present application claims the benefit under 35 U.S.C. § 119 of German Patent Application No. 102017206555.9 filed on Apr. 19, 2017, and German Patent Application No. 102018200724.1 filed on Jan. 17, 2018, each of which is expressly incorporated herein by reference in its entirety.

FIELD

The present invention relates to a method for generating a data signal interference and, based on this, a method for generating a manipulated data signal, a method for assessing a robustness of an actuator control system, a method for operating an actuator control system, a method for training an actuator control system, an actuator control system that has been trained with this method, a computer program, which includes instructions that are configured to carry out one of these methods when it is executed on a computer, a machine-readable memory medium on which the computer program is stored and a computer, which is configured to carry out one of these methods.

BACKGROUND INFORMATION

A neuronal network for a control device is described in German Patent Application No. DE 10 2005 050 577 A1. In this application, a neuronal network 1 for a control device is tested. The neuronal network includes a plurality of first neurons N1, N2, ..., Nn in a first layer and a second neuron M in a second layer following the first layer. Each test signal combination is selected from a predefined plurality of test signal combinations. Each test signal combination assigns a test input signal vector ut1, ut2, ..., utk to each first neuron N1, N2, ..., Nn, which is either a zero signal or which saturates the associated first neuron N1, N2, ..., Nn in such a way that the first neuron N1, N2, ..., Nn outputs a lower saturation value φmin, or saturates the associated first neuron N1, N2, ..., Nn in such a way that the first neuron N1, N2, ..., Nn outputs an upper saturation value. The test signal combination is applied to the first neurons N1, N2, ..., Nn and the output signal p of the second neuron M is detected. A sub-test signal is stored if the output signal p is greater than a predefined threshold value. A positive complete test signal is output after each of the test signal combinations is applied and if no sub-test signal is stored for the predefined plurality of the test signal combinations.

SUMMARY

An example method in accordance with the present invention may have an advantage that it enables semantic segmentations that are ascertained with the aid of machine learning methods to be made particularly robust against misleading examples ("adversarial examples"). Adversarial examples are slightly manipulated input data (which in the case of image data are so similar that they are virtually indistinguishable to human experts), which may result in a significant change in the ascertained semantic segmentation. It would be possible, for example, for a malicious attacker to use such an adversarial example, in order to mislead an autonomous robot by, for example, suppressing a semantic segmentation which marks an actually existing flow as "flow", which could endanger the autonomous robot that carries out its route planning based on this semantic segmentation. The effectiveness of such attacks may be reduced with the method according to the present invention.

Advantageous refinements of the present invention are described herein.

In a first aspect, the present invention relates to a method for generating a universal data signal interference for generating a manipulated data signal for deceiving a first machine learning system, which is configured to ascertain a semantic segmentation of a received, one-dimensional or multidimensional data signal, which characterizes a state of an agent system, in particular, an actuator system that includes an actuator 10 and surroundings (20) of the actuator 10.

A semantic segmentation of the data signal in this method means, as usual, that parts of the data signal are assigned a semantic value from a predefined selection of possible semantic values.

The method includes the steps:

a) ascertaining a training data set, which includes pairs of data signals and associated desired semantic segmentations, b) generating the data signal interference as a function of the data signals of the training data set, of the associated desired semantic segmentations as well as of estimated semantic segmentations of the data signals acted upon by the data signal interference.

The data signal interference thus ascertained is universal in the sense that as a result of the data signal interference (i.e., as a result of the application of the data signal interference), a multitude of data signals not contained in the training data set can be transformed into adversarial examples. If the semantic segmentation of these adversarial examples is ascertained with the first machine learning system, the result, as a function of the desired semantic segmentation, is a clear difference compared to the corresponding semantic segmentation of the respective corresponding data signals not acted upon.

The estimated semantic segmentation in this case may be ascertained by the first machine learning system, or by a simulation of the first machine learning system.

The semantic segmentation in this case takes place preferably "pixel by pixel", i.e., the semantic segmentation has the same dimensionality as the one-dimensional or multidimensional data signal and assigns preferably each data point in the one-dimensional or multidimensional data signal a semantic value.

Manipulated data signals, in particular, may be generated with such a data signal interference by applying a data signal interference (for example, by addition) to a data signal. By generating such manipulated data signals, it is possible, in particular, to improve and reliably assess the robustness of the first machine learning system for semantic segmentation against any attackers. As a result of the independence of the received data signal and of the data signals of the training data set, it is possible, in particular, to detect a broad class of adversarial examples with the aid of the generated data signal interference.

In one refinement, it may be provided that the generation of the data signal interference takes place in such a way that the data signal interference is periodic. In this way, an over-adaptation of the manipulated data signal to the training data set may be effectively suppressed. Such an over-adaptation would otherwise be expected due to the dimensionality of the data signal interference, which has the same dimensionality as the data signal.

Alternatively or in addition, it may be provided that the desired semantic segmentations are selected as a function of an estimated semantic segmentation of the associated data signal.

In this way, it is possible to generate the desired semantic segmentations with particularly little effort, since an actual "true" semantic segmentation of the data signals of the training data set is not required.

In another refinement of this aspect, it may be provided that the desired semantic values are selected as a function of whether the estimated semantic values assume a predefinable value. In this way, attacks aimed at suppressing information of data points whose semantic value has a predefined value, may be particularly easily simulated.

In this case, it may be provided that the desired semantic values may be replaced by a substitute value at a point at which the estimated semantic values assume the predefined value. The substitute value in this case is a value different from the estimated semantic value.

The substitute value is preferably the estimated semantic value at a substitute point, which is close to the point. The substitute point in this case may, for example, be the next closest point, whose estimated semantic value differs from the predefinable value.

It may be further provided that the desired semantic values are selected equal to the estimated semantic values if the estimated semantic values do not assume the predefinable value.

With each of the two aforementioned measures, it is possible to simulate an attacker that causes the suppressed data points to transition particularly harmoniously into the semantic segmentation of the background and thereby carry out a particularly targeted attack.

This may occur if the data signal interference is generated as a function of a function value of a cost function of the first machine learning system, which assumes this cost function among data signals acted upon by this data signal interference and for the desired semantic segmentations. This means, the cost function has as arguments in the usual manner the output value (the ascertained semantic segmentation) of the first machine learning system, which the learning system ascertained as a function of its input signal (of the data signal). The cost function also has, as usual, a desired semantic segmentation (i.e., desired semantic values) as an additional argument. It is now provided here that the data signal as input signal is replaced by the data signal acted upon by the data signal interference.

Specifically, the data signal interference may be selected from a set of permitted data signal interferences in such a way that it minimizes numerically the cost function among data signals acted upon with this data signal interference for the desired semantic values. Such a numerical minimization may take place, for example, using an iterative method, the iterative method being terminated when a predefinable abort criterion (for example, after a predefinable number of iteration steps) is reached. It is clear to those skilled in the art that the theoretically achievable minimum is normally not precisely but merely approximately achieved.

In one flexible refinement, it may be provided that the cost function includes two fractions, one of which characterizes the fraction of points on the cost function whose estimated semantic values assume the predefinable value and the other fraction characterizes the fraction of points on the cost function whose estimated semantic values do not assume the predefinable value, these two fractions being predefinably weighted against one another.

In this way, it is possible in a particularly easy manner to flexibly simulate such attacks, whose aim is to preferably efficiently suppress information of data points whose semantic segmentation has a predefinable value (this may occur by weighting the first fraction high), as well as to simulate attacks, whose aim is to leave the semantic background preferably intact, in order to be particularly difficult to identify (this may occur by weighting the second fraction high).

In another refining aspect, it is provided to apply the present invention in a method for assessing a robustness of an actuator control system for activating an actuator that includes a first machine learning system, which is configured to ascertain a semantic segmentation of a received one-dimensional or multidimensional data signal, which characterizes a state of an actuator system that includes the actuator and surroundings of the actuator, the actuator system being configured to ascertain an activation signal as a function of the ascertained semantic segmentation and to activate the actuator as a function of the ascertained activation signal, a manipulated data signal being generated as a function of the data signal and of the data signal interference, (the data signal interference having been ascertained with one of the aforementioned methods), and a second activation signal is ascertained as a function of an ascertained second semantic segmentation, which is ascertained with the aid of the first machine learning system by exchanging the data signal with the manipulated data signal (i.e., the manipulated data signal instead of the data signal is fed to the first machine learning system). In this case, it is then decided as a function of activation signal and also as a function of the second activation signal whether or not the actuator control system is robust.

Such a method may run, in particular, also during the operation of the actuator control system, in order to assess continually or at regular time intervals whether the actuator control system would behave robustly against a possible attack.

Based on this, a method for operating an actuator control system for activating an actuator may be provided, it being assessed with the aid of the aforementioned method whether or not the actuator control system is robust and the actuator control system activating the actuator as a function of the assessment, the actuator control system capable of being transferred, in particular, to a safe mode if the assessment indicates that the actuator control system is not robust.

In still another aspect, the present invention relates to a method for training an actuator control system, which includes, in particular, a first machine learning system, which is configured to ascertain a semantic segmentation of a received one-dimensional or multidimensional data signal, which characterizes a state of an agent system, in particular, an actuator system that includes an actuator and surroundings of the actuator, the actuator control system being further configured to ascertain an output value of a second machine learning system, the output value characterizing a probability that the semantic segmentation is false, in particular, whether the data signal is an adversarial example, whereby an activation of the actuator may take place as a function of the ascertained semantic segmentation, and the activation of the actuator may take place as a defensive response to an error if it has been decided that an error exists.

This training method includes the following steps:

a) selecting a subset of data signals from a training set for the second machine learning system, which includes the data signals, b) deciding whether or not the data signals of this subset are to be manipulated c) if it has been decided that the data signals are to be manipulated, ascertaining manipulated data signals as a function of the respective data signals and of the data signal interference ascertained with the aforementioned method and replacement of the data signals by the respective ascertained manipulated data signals, d) setting a desired output value to the value of a predefinable first numerical value if the data signals are not manipulated, or to a predefinable second numerical value different from the first numerical value if the data signals are manipulated, and e) training the parameters of the second machine learning system with the (if necessary, manipulated) subset of observed values and associated desired output values.

In still another aspect, the present invention relates to an actuator control system that includes a first machine learning system, which is configured to ascertain a semantic segmentation of a received one-dimensional or multidimensional data signal, and which includes a second machine learning system, which has been trained with this training method.

Specific embodiments of the present invention are explained in greater detail below with reference to the figures.

DETAILED DESCRIPTION OF EXAMPLE EMBODIMENTS

Figure 1:
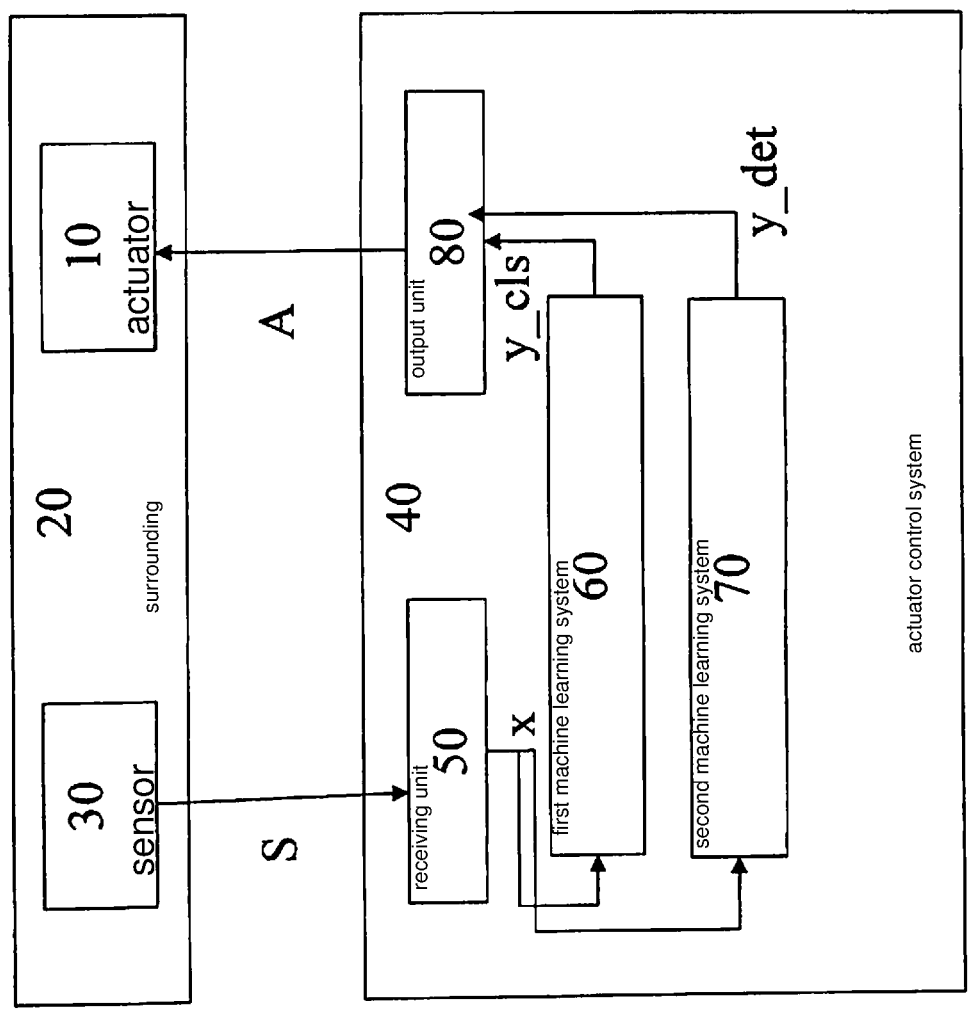
FIG. 1 schematically shows an interaction between actuator and actuator control system.

FIG. 1 shows an actuator 10 in its surroundings 20 in interaction with an actuator control system 40. Actuator 10 and surroundings 20 are referred to jointly below as actuator system. A state of the actuator system is detected with a sensor 30, which may also be in the form of a plurality of sensors. An output signal S of sensor 30 is conveyed to actuator control system 40. Actuator control system 40 ascertains from this an activation signal A, which actuator 10 receives.

Actuator 10 may, for example, be a (partially) autonomous robot, for example, a (partially) autonomous motor vehicle. Sensor 30 may, for example, be one or multiple video sensor(s) and/or one or multiple radar sensor(s) and/or one or multiple ultrasonic sensor(s) and/or one or multiple position sensor(s) (for example, GPS). Alternatively or in addition, sensor 30 may also include an information system, which ascertains a piece of information about a state of the actuator system such as, for example, a weather information system, which ascertains an instantaneous or future weather condition in surroundings 20.

In another exemplary embodiment, actuator 10 may be a manufacturing robot, and sensor 30, for example, may then be an optical sensor, which detects properties of manufactured products of the manufacturing robot.

In another exemplary embodiment, actor 10 may be an enabling system, which is configured to enable or not enable the activity of a device. Sensor 30 may, for example, be an optical sensor (for example for detecting image data or video data), which is configured to detect a face. Actuator 10 ascertains as a function of activation signal A an enable signal, which may be used to enable the device as a function of the value of the enable signal. The device may, for example, be a physical or logical access control. The access control may then provide that access is allowed or is not allowed as a function of the value of activation signal A.

Actuator control system 40 receives output signal S of the sensor in an optional receiving unit 50, which converts output signal S into a data signal x (alternatively, output signal S may also be directly adopted as data signal x). Data signal x may, for example, be a segment or a further processing of output signal S. Output signal x is fed to a first machine learning system 60, for example, to a neuronal network.

In a preferred exemplary embodiment described below, data signal x is a two-dimensional image signal, the pixels of which are characterized by one or three numerical values. However, data signal x may also be another one-dimensional or multidimensional data signal.

The first machine learning system 60 ascertains an associated semantic segmentation y_cls from image signal x. In this case, each section of image signal x is assigned a semantic value. In the exemplary embodiment, a segmentation is carried out pixel by pixel, i.e., semantic segmentation y_cls has the same dimension as data signal x.

In this case, semantic segmentation y_cls may characterize probabilities that this pixel is classified as belonging to a semantic class (from a plurality of semantic classes). Semantic segmentation y_cls may be a vectorial valued variable for each pixel, which indicates for each of the semantic classes with the aid of an associated number in the value interval [0;1] how high the probability is that this pixel is to be assigned to the respective semantic class. Semantic segmentation y_cls may also be a scalar variable for each pixel, for example, an identifier of the one semantic class whose probability described above assumes the greatest value.

Actuator control system 40 further includes a second machine learning system 70, for example, a neuronal network. Second machine learning system 70 also receives image signal x and ascertains from this an output value y_det which, for example, may be a number in the value range [0;1] and may characterize a probability that the observed value B has been manipulated in such a way that the semantic segmentation y_cls does not correctly characterize the image data x.

In the exemplary embodiment, this is achieved in that second machine learning system 70 is configured in such a way that output value y_det characterizes a probability that image signal x is an adversarial example.

Semantic segmentation y_cls and output value y_det are conveyed to an output unit 80, which ascertains therefrom activation signal A. It is possible, for example, that the output unit initially checks whether output value y_det is smaller than a predefinable threshold value. If this is the case, activation signal A is ascertained as a function of semantic segmentation y_cls. This is the normal case. If, on the other hand, it is ascertained that output value y_det is not smaller than the predefinable threshold value, it may then be provided that activation signal A is formed in such a way that it transfers actuator A into a safe mode.

In one specific embodiment, actuator control system 40 includes a computer and a machine-readable memory medium (not depicted), on which a computer program is stored, so that when it is executed by the computer, it prompts the computer to execute the described functionalities of actuator control system 40. First machine learning system 60 and second machine learning system 70 in this case may be implemented, in particular, as separate or as shared computer programs.

Figure 2:
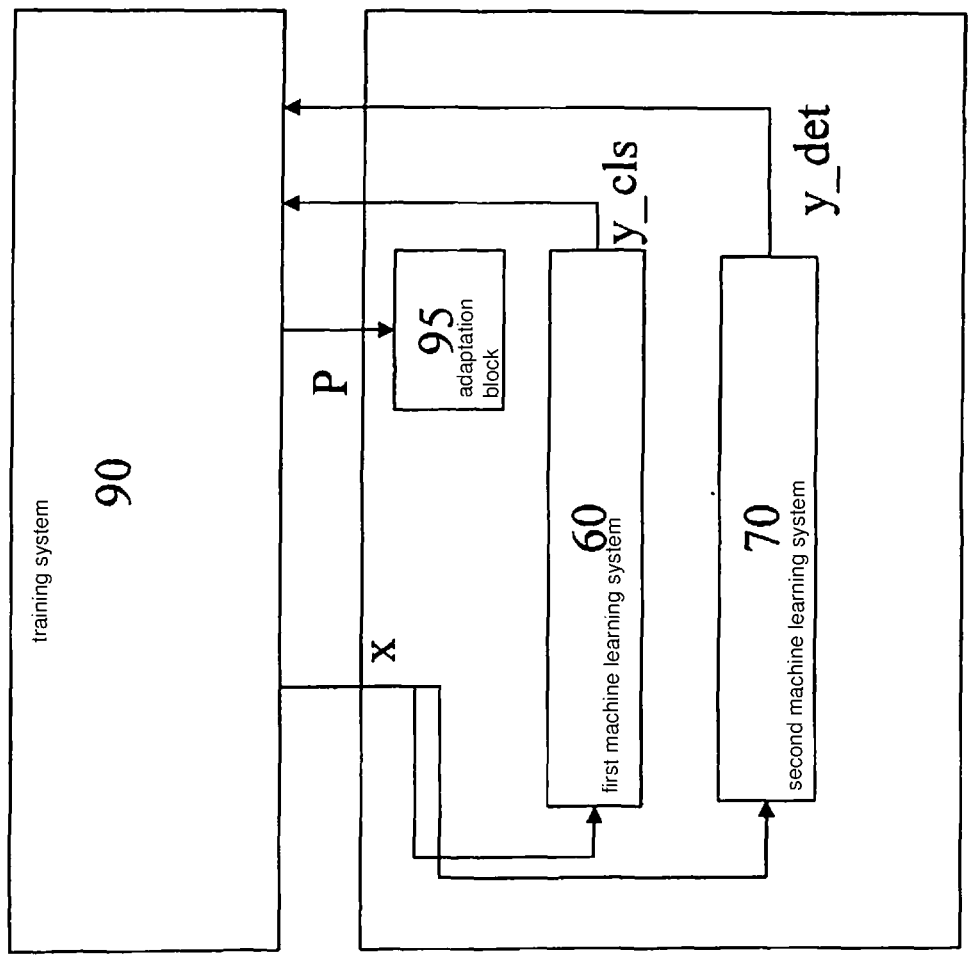
FIG. 2 schematically shows an interaction between training system and actuator control system.

FIG. 2 illustrates the interaction between a training system 90, first machine learning system 60 and second learning system 70. Training system 90 has a training data set available, which includes image signals x. One or multiple image signal(s) x is/are selected from the training data set and provided to first machine learning system 60. These may be individual image signals x, i.e., signals that are fed to first machine learning system 60 even during interaction of actuator control system 40 with actuator 10 and sensor 30. These may also be a stack ("batch"), i.e., a plurality of such image data x.

First machine learning system 60 ascertains one semantic segmentation y_cls each from the image data x fed to it. Second machine learning system 60 also ascertains an output value y_det analogously to FIG. 1. Semantic segmentation y_cls and output value y_det are fed again to training system 90. Training system 90 ascertains therefrom a parameter adaptation signal P, which codes which parameters of second machine learning system 70 are to change their value. This desired adaptation takes place, for example, by specifying desired values for output value y_det and back propagation. For this purpose, training system 90 feeds parameter adaptation signal P to an adaptation block 95, which accordingly adapts the parameters in first machine learning system 60 and in second machine learning system 70. In this case, it is possible that only the parameters of first machine learning system 60 or only the parameters of second machine learning system 70 are adapted.

In one specific embodiment, training system 90 includes a computer and a machine-readable memory medium (not depicted), on which a computer program is stored which, when it is executed by the computer, prompts the computer to execute the described functionalities of learning system 90.

Figure 3:
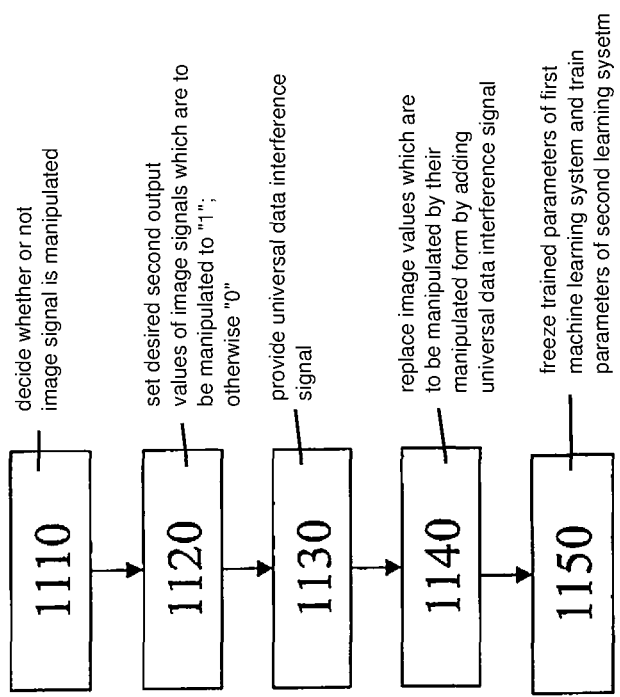
FIG. 3 shows one specific embodiment of one training method.

FIG. 3 shows in a flow chart one specific embodiment of a method for training the parameters of second machine learning system 70 by training system 90.

In this embodiment, the parameters of first machine learning system 60 are frozen and the parameters of second machine learning system 70 are trained.

Initially 1110, it is decided for each image signal x that has been fed to first machine learning system 60 in the first training phase whether or not it is manipulated. This may occur randomly with a predefinable probability, for example, of 50%.

Subsequently 1120, desired second output values y_det of image values x, which are to be manipulated, are set to value "1", otherwise to value "0".

Figure 4:
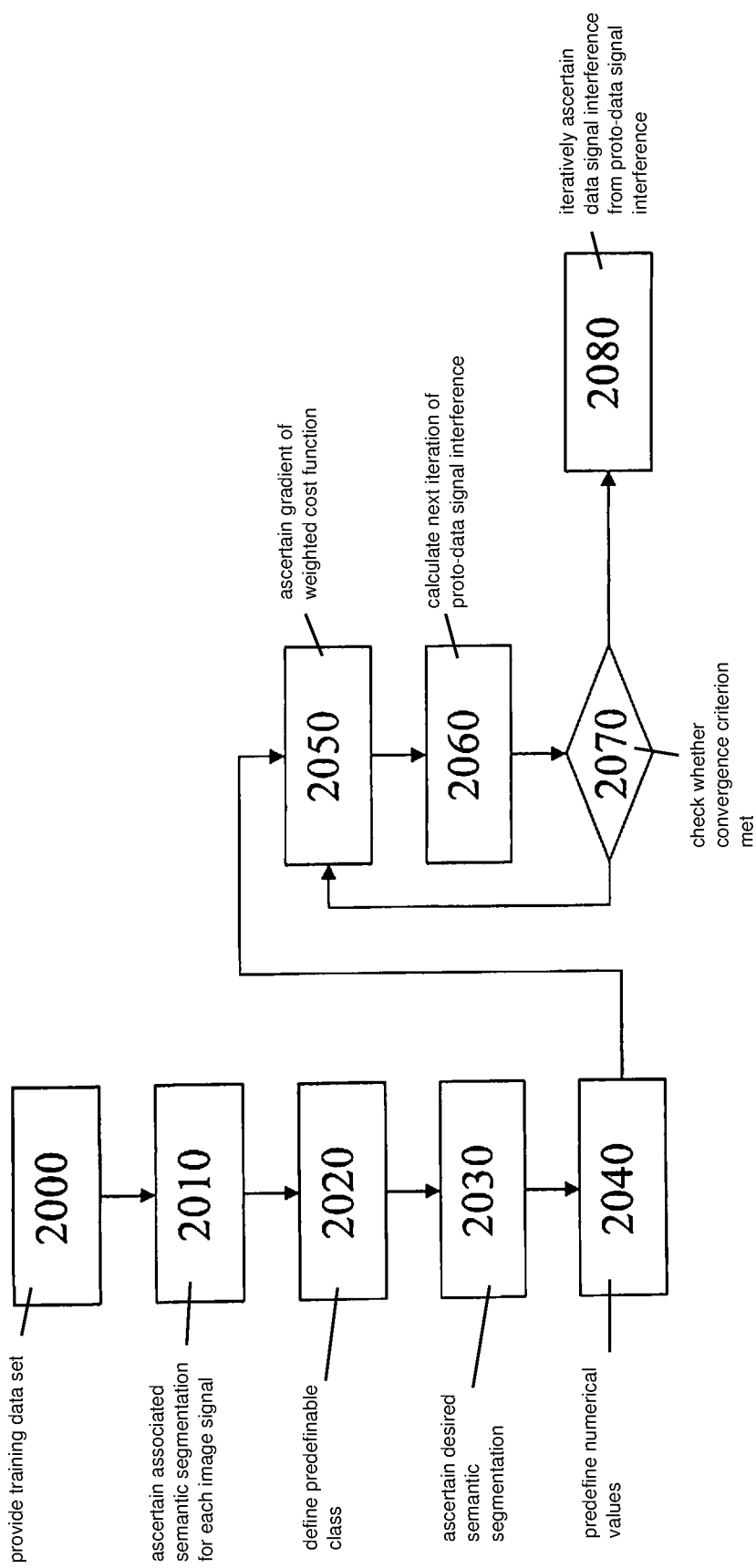
FIG. 4 shows one specific embodiment of the method for ascertaining the data signal interference.

In the following step 1130, a universal data interference signal Ξ is provided. Universal data interference signal Ξ may either be read in, or it may be generated. The method for generating universal data interference signal Ξ is illustrated in FIG. 4.

Then 1140, image values x, which are to be manipulated, are replaced by their manipulated form $x^{adv}$, by adding universal data interference signal Ξ to x.

Then, in the following step 1150, the trained parameters of first machine learning system 60 are frozen and the parameters of second machine learning system 70 are trained.

The parameters are trained with the aid of the described cost function $j_{det}$ of second machine learning system 70 and back propagation.

This ends second phase 1100.

FIG. 4 shows in a flow chart the method for generating universal data interference signal Ξ.

In a first step 2000, a training data set $D^{train}$ made of image signals $x^{(k)}$, k=1 ... m having a fixed number m is provided.

Step 2010 follows, in which the associated semantic segmentation y_cls is ascertained for each of image signals $x^{(k)}$ with the aid of first machine learning system 60 (instead of first machine learning system 60, an equivalent system may be applied). This semantic segmentation y_cls is also referred to below with the symbol $f_\theta(x^{(k)})$, θ referring to the parameters of first machine learning system 60 and f referring to the mapping rule, which machine learning system 60 carries out. Thus, one semantic value $y^{pred}_{ij}=f_\theta(x^{(k)})_{ij}$ is estimated for each point (i,j). The associated estimated semantic segmentation is also referred to with the symbol $y^{pred}$.

In step 2020, a predefinable class o is defined, i.e., o is a predefinable value, which corresponds to one of the permissible semantic values. A foreground set $1_o^{(k)}$ is then defined as the set of all those points (i,j) of respective image signal $x^{(k)}$, whose associated estimated semantic values $y^{pred}_{ij}$ assume this predefinable value o. A background set $1_{bq}^{(k)}$ is also ascertained, which includes all points whose associated estimated semantic values $y^{pred}_{ij}$ do not assume this predefined value o. The combination of foreground set $1_o^{(k)}$ and background set $1_{bg}^{(k)}$ is the same for each value of k and is also referred to as total set 1.

In step 2030, a desired semantic segmentation $y^{target,k}$, whose associated semantic values $y^{target,k}_{ij}$ for each point (i,j) contained in background set $1_{bg}^{(k)}$ are selected equal to the corresponding estimated semantic value $y^{pred}_{ij}$ is ascertained for each of image signals $x^{(k)}$. A substitute value is also ascertained for each point (i,j) that is contained in foreground set $1_o^{(k)}$. For this purpose, a substitute point (i'j') is initially ascertained in image signal $x^{(k)}$, specifically with the aid of $$i'j' = \arg\min(i'-i)^2 + (j'-j)^2.$$

$$i,j \in I_{bq}$$

The semantic value is then selected as the substitute value at this substitute point (i'j'). This value is selected in the desired semantic segmentation $y^{target,k}$ for the point (i,j), i.e., $y^{target,k}_{ij} = y^{pred}_{i'j'}$.

Then 2040, numerical values h, w are predefined. h, w are selected in such a way that the height of each of image signals $x^{(k)}$ is an integer multiple of h, and that the width of each of image signals $x^{(k)}$ is an integer multiple of w, so that the dimension of image signals $x^{(k)}$ in each case is Rh×Sw, with integer R,S. A proto-data signal interference $\xi^{(0)}$ with the dimension of h×w points is initialized with $\xi^{(0)}=0$. A counter n is set to value n=0.

Then (2050), the variable $$\nabla^D = \frac{1}{mRS}\sum_{r=1}^{R}\sum_{s=1}^{S}\sum_{k=1}^{m}\nabla_x J_{ss}^{\omega}\left(f_\theta(x_{[r,s]}^{(k)}+\xi^{(n)}),y_{[r,s]}^{targetk}\right)$$

is calculated. In this case, [r,s] refers to a set of points according to $$[r,s]=\{i,j:[rh\leq i<(r+1)h]\wedge[[sw\leq j<(s+1)w]]\}.$$

$x^{(k)}_{[r,s]}$ refers to a corresponding section of image signal $x^{(k)}$, $y^{target,k}_{[r,s]}$ to a corresponding section of the associated desired semantic segmentation $y^{targt,k}$.

The variable $J^\omega_{ss}$ refers to a weighted cost function of first mechanical learning system (60) according to $$J_{ss}^{\omega}(f_\theta(x),y^{target}) = \frac{1}{|I|}\left\{\omega\sum_{(i,j)\in f_\theta}J_{cls}(f_\theta(x)_{ij},y_{ij}^{target})+(1-\omega)\sum_{(i,j)\in I_{bg}}J_{cls}(f_\theta(x)_{ij},y_{ij}^{target})\right\}$$

In this case, $j_{cls}$ is a cost function of first machine learning system 60, for example, a cross entropy.

The variable ω is a predefinable variable, which may be predefined in the value range [0;1], for example, to the value 0.5.

Thus, in step 2050, a gradient of the (weighted) cost function $J^\omega_{ss}$ averaged via the training data set is ascertained.

Subsequently (2060), a next iteration of the proto-data signal interference $\xi^{(n+1)}$ is calculated according to the formula $$\xi^{(n+1)}=\text{Clip}_\exists\{\xi^{(n)}-\beta\text{sgn}(\nabla^D(\xi^{(n)}))\}$$

In this case, the function $\text{Clip}_\varepsilon(x)$ standardizes values of a variable x to a ε-sphere by the root. The standard in this case may be an $L^2$ standard, or also an $L^\infty$ standard. α is set to a predefinable value, for example, α=0.25. The value of variable n is incremented by 1.

Then 2070, it is checked whether a convergence criterion is met. For example, it may be checked whether n has exceeded a predefinable limiting value nmax, for example nmax=10. If this is not the case, a return is made to step 2050. Otherwise, the data signal interference Ξ is iteratively ascertained in step 2080 from proto-data signal interference $\xi^{(n)}$ with $\Xi_{ij}=\xi^{(n)}_{ij}$ for i<h, j<w and from the periodic boundary condition $\Xi_{i+h,j}=\Xi_{i,j+w}=\Xi_{i,j}$. This ends this method.

Figure 5:
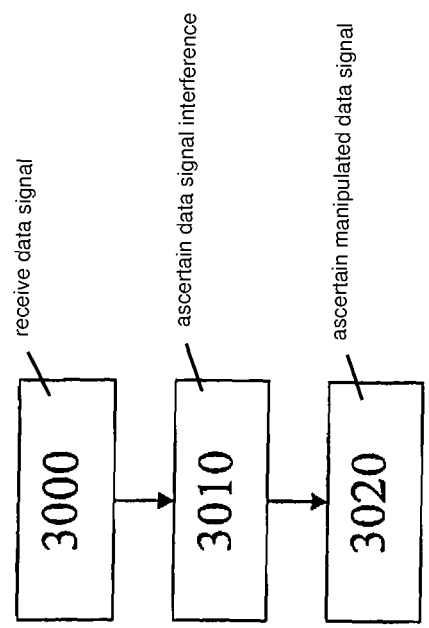
FIG. 5 shows one specific embodiment of the method for ascertaining the manipulated data signal.

FIG. 5 shows in a flow chart an exemplary embodiment of the method for ascertaining the manipulated data signal $x^{adv}$. In a first step 3000, a data signal x is received. In the next step 3010, the data signal interference Ξ is ascertained optionally with the aid of the method illustrated in FIG. 4.

Alternatively, it has already been ascertained at an earlier point in time with the aid of the method illustrated in FIG. 4, stored in a memory medium and is then retrieved in step 3010. Subsequently 3020, manipulated data signal $x^{adv}$ is ascertained as an addition of data signal x and data signal interference Ξ.

This ends this method. The method may be implemented as a computer program, may be stored on the memory medium of actuator control system 40 and/or training system 90 or carried out by same. The computer program may also be stored on a generic computer and may be executable by same.

Figure 6:
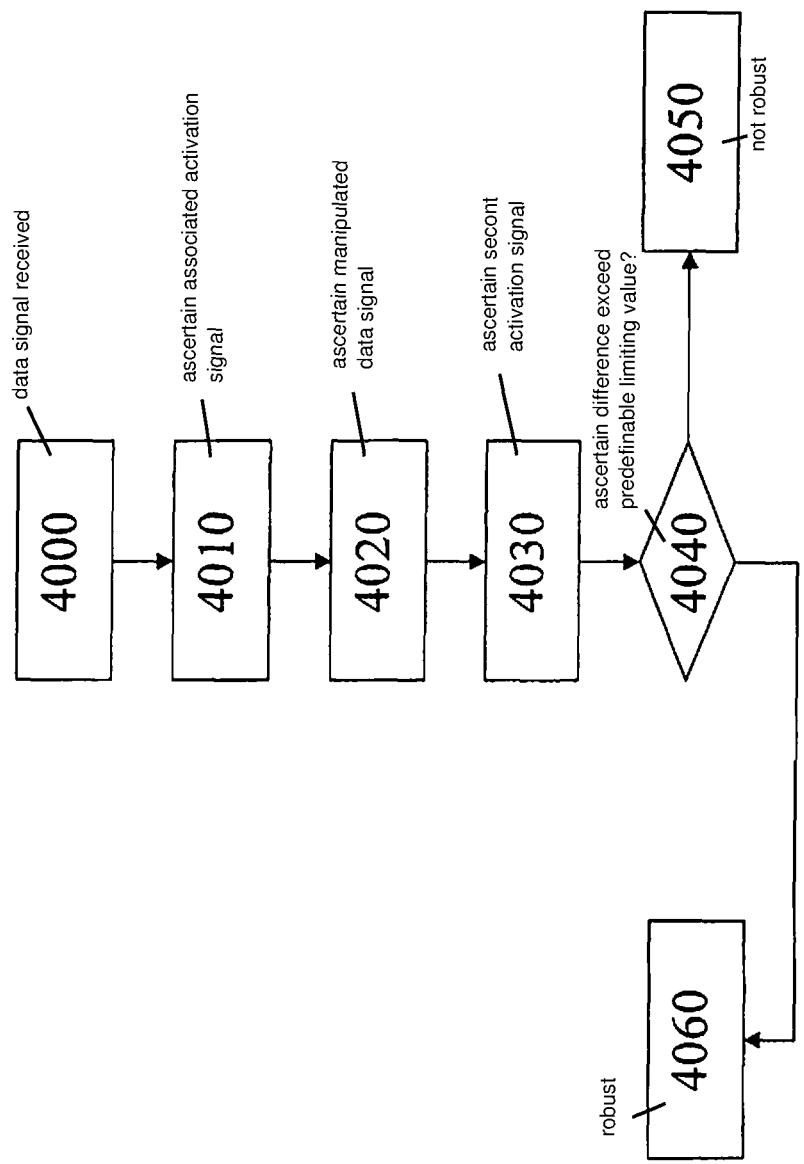
FIG. 6 shows one specific embodiment of the method for assessing the robustness of the actuator control system.

FIG. 6 shows in a flow chart an exemplary embodiment of the method for assessing the robustness of actuator control system 40. In a first step 4000, a data signal x is received. Subsequently 4010, actuator control system 40 ascertains therefrom an associated activation signal A, in order to activate actuator 10. Then 4020, a manipulated data signal $x^{adv}$ is ascertained from data signal x with the method illustrated in FIG. 5. This manipulated data signal $x^{adv}$ is also fed to first machine learning system 60 and a second semantic segmentation y_cls$^{adv}$ is ascertained. Similar to the ascertainment of activation signal A, a second activation signal $A^{adv}$ is ascertained from ascertained second semantic segmentation y_cls$^{adv}$. Then 4040, the difference between activation signal A and second activation signal $A^{adv}$ is ascertained and it is checked 4040 whether an absolute value of this difference exceeds a predefinable limiting value. If this is the case (4050), it is decided that actuator control system 40 is not robust, otherwise 4060 it is decided that actuator control system 40 is robust. This ends this method. The method may be implemented as a computer program, stored on the memory medium of actuator control system 40 or carried out by same. The computer program may also be stored on a generic computer couplable to actuator control system 40, stored and executed by same.

Figure 7:
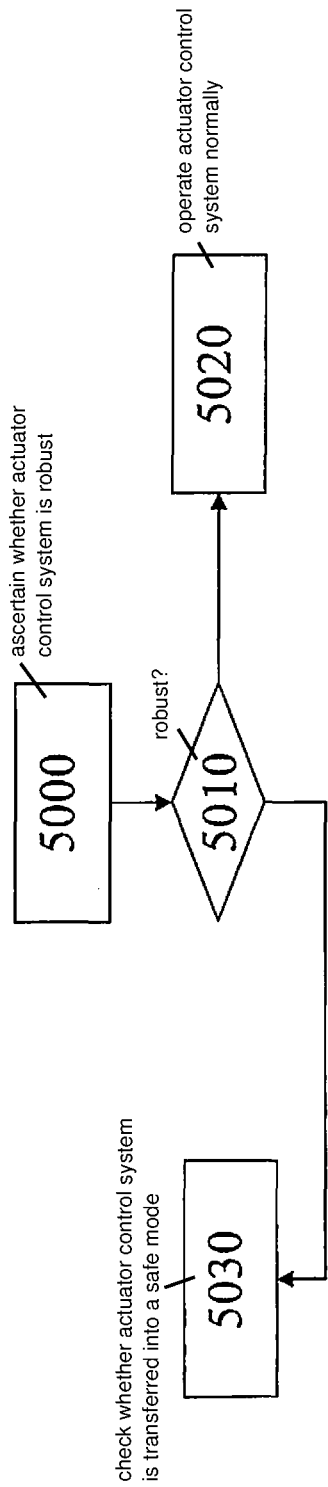
FIG. 7 shows one specific embodiment of the method for operating the actuator control system.

FIG. 7 shows in a flow chart an exemplary embodiment of the method for operating the actuator control system. In a first step 5000, it is ascertained with the method illustrated in FIG. 6 whether or not actuator control system 40 is robust. In step 5010, it is then checked whether it has been decided that actuator control system 40 is robust. If this is the case 5020, actuator control system 40 is operated normally and actuator 10 is activated normally. If this is not the case 5030, it is checked whether actuator control system 40 is transferred into a safe mode in which it may be provided, for example, that an absolute value of activation signal A is limited to values smaller than a criticality limit. This ends the method. The method may be implemented as a computer program, may be stored on the memory medium of actuator control system 40 or may be carried out by same.

What is claimed is:

1. A method for generating a universal data signal interference for generating a manipulated data signal for deceiving a first machine learning system, which is configured to ascertain a semantic segmentation of a received one-dimensional or multidimensional data signal, the method comprising:
   a) ascertaining a training data set that includes pairs of data signals and associated desired semantic segmentations; and
   b) generating the data signal interference as a function of the data signals of the training data set, of the associated desired semantic segmentation, and of estimated semantic segmentations of the data signals of the training data set acted upon by the data signal interference.

2. The method as recited in claim 1, wherein the generation of the data signal interference takes place in such a way that the data signal interference is periodic.

3. The method as recited in claim 1, wherein the desired semantic segmentations are selected as a function of an estimated semantic segmentation of the associated data signal.

4. The method as recited in claim 3, wherein the desired semantic values are selected as a function of whether the estimated semantic values assume a predefinable value.

5. The method as recited in claim 4, wherein the desired semantic values are replaced by a substitute value at a point, at which the estimated semantic values assume the pre-defined value.

6. The method as recited in claim 5, wherein the substitute value is the estimated semantic value of a substitute point, which is near the point.

7. The method as recited in claim 4, wherein the generation of the data signal interference takes place as a function of a function value of a weighted cost function of the first machine learning system, which assumes the cost function among data signals acted upon by the data signal interference and for the desired semantic values.

8. The method as recited in claim 7, wherein the data signal interference is selected from a set of permitted data signal interferences in such a way that it numerically minimizes the cost function for the desired semantic values among data signals acted upon by the data signal interference.

9. The method as recited in claim 7, wherein the cost function includes two fractions, one of which characterizes a fraction of points on the cost function, whose estimated semantic values assume the predefinable value, and the other fraction characterizes a fraction of points on the cost function, whose estimated semantic values do not assume the predefinable value, the two fractions being predefinably weighted against one another.

10. The method as recited in claim 3, wherein the desired semantic values are selected identically to the estimated semantic values, if the estimated semantic values do not assume the predefinable value.

11. A method for generating a manipulated data signal for deceiving a first machine learning system, which is configured to ascertain a semantic segmentation of a received one-dimensional or multidimensional data signal, the method comprising:
  generating a universal data signal interference, the generating including:
    a) ascertaining a training data set that includes pairs of data signals and associated desired semantic segmentations, and
    b) generating the data signal interference as a function of the data signals of the training data set, of the associated desired semantic segmentation, and of estimated semantic segmentations of the data signals of the training data set acted upon by the data signal interference; and
  generating the manipulated data signal as a function of the received data signal and of the generated data signal interference.

12. A method for assessing a robustness of an actuator control system for activating an actuator, which includes a first machine learning system that is configured to ascertain a semantic segmentation of a received one-dimensional or multidimensional data signal, which characterizes a state of an actuator system that includes the actuator and surroundings of the actuator, the actuator control system being configured to ascertain an activation signal as a function of the ascertained semantic segmentation and to activate the actuator as a function of the ascertained activation signal, the method comprising:
  generating a manipulated data signal as a function of the received data signal and of a data signal interference, the data signal interference being generated by:
    a) ascertaining a training data set that includes pairs of data signals and associated desired semantic segmentations, and
    b) generating the data signal interference as a function of the data signals of the training data set, of the associated desired semantic segmentation, and of estimated semantic segmentations of the data signals of the training data set acted upon by the data signal interference; and
  ascertaining a second activation signal as a function of an ascertained second semantic segmentation, which is ascertained with the aid of the first machine learning system when the received data signal is replaced by the manipulated data signal, it being decided as a function of activation signal and second activation signal whether or not the actuator control system is robust.

13. A method for operating an actuator control system for activating an actuator, comprising:
  assessing a robustness of the actuator control system, which includes a first machine learning system that is configured to ascertain a semantic segmentation of a received one-dimensional or multidimensional data signal, which characterizes a state of an actuator system that includes the actuator and surroundings of the actuator, the actuator control system being configured to ascertain an activation signal as a function of the ascertained semantic segmentation and to activate the actuator as a function of the ascertained activation signal, the assessing including:
    generating a manipulated data signal as a function of the received data signal and of a data signal interference, the data signal interference being generated by:
      a) ascertaining a training data set that includes pairs of data signals and associated desired semantic segmentations, and
      b) generating the data signal interference as a function of the data signals of the training data set, of the associated desired semantic segmentation, and of estimated semantic segmentations of the data signals of the training data set acted upon by the data signal interference; and
    ascertaining a second activation signal as a function of an ascertained second semantic segmentation, which is ascertained with the aid of the first machine learning system when the received data signal is replaced by the manipulated data signal, it being decided as a function of activation signal and second activation signal whether or not the actuator control system is robust;
  activating, by the actuator control system, the actuator as a function of the assessment, the actuator control system being transferred to a safe mode when the assessment indicates that the actuator control system is not robust.

14. A method for training an actuator control system, which includes a first machine learning system configured to ascertain a semantic segmentation of a received one-dimensional or multidimensional data signal, the actuator control system further being configured to ascertain an output value of a second machine learning system, the method comprising:
  a) selecting a subset of data signals from a training set for the second machine learning system, which includes the data signals;
  b) deciding whether or not the data signals of the subset are to be manipulated;
  c) when the data signals are to be manipulated, ascertaining manipulated data signals as a function of the respective data signals and as a function of a data signal interference ascertained as follows:
  i) ascertaining a training data set that includes pairs of data signals and associated desired semantic segmentations; and
  ii) generating the data signal interference as a function of the data signals of the training data set, of the associated desired semantic segmentation, and of estimated semantic segmentations of the data signals of the training data set acted upon by the data signal interference,
and replacing the data signals with the respective ascertained manipulated data signals;
  d) setting a desired output value to the value of a predefinable first numerical value if the data signals are not manipulated, or to a second predefinable numerical value differing from the first numerical value if the data signals are manipulated; and
  e) training the parameters of the second machine learning system with the subset of data signals and associated desired output values.

15. A non-transitory machine-readable memory medium on which is stored a computer program for operating an actuator control system for activating an actuator, the computer program, when executed by a computer, causing the computer to perform:
  assessing a robustness of the actuator control system, which includes a first machine learning system that is configured to ascertain a semantic segmentation of a received one-dimensional or multidimensional data signal, which characterizes a state of an actuator system that includes the actuator and surroundings of the actuator, the actuator control system being configured to ascertain an activation signal as a function of the ascertained semantic segmentation and to activate the actuator as a function of the ascertained activation signal, the assessing including:
    generating a manipulated data signal as a function of the received data signal and of a data signal interference, the data signal interference being generated by:
      a) ascertaining a training data set that includes pairs of data signals and associated desired semantic segmentations, and
      b) generating the data signal interference as a function of the data signals of the training data set, of the associated desired semantic segmentation, and of estimated semantic segmentations of the data signals of the training data set acted upon by the data signal interference; and
    ascertaining a second activation signal as a function of an ascertained second semantic segmentation, which is ascertained with the aid of the first machine learning system when the received data signal is replaced by the manipulated data signal, it being decided as a function of activation signal and second activation signal whether or not the actuator control system is robust;
  activating, by the actuator control system, the actuator as a function of the assessment, the actuator control system being transferred to a safe mode when the assessment indicates that the actuator control system is not robust.

16. A computer designed to generate a universal data signal interference for generating a manipulated data signal for deceiving a first machine learning system, which is configured to ascertain a semantic segmentation of a received one-dimensional or multidimensional data signal, the computer designed to:
  a) ascertaining a training data set that includes pairs of data signals and associated desired semantic segmentations; and
  b) generating the data signal interference as a function of the data signals of the training data set, of the associated desired semantic segmentation, and of estimated semantic segmentations of the data signals of the training data set acted upon by the data signal interference.

17. An actuator control system, which includes a first machine learning system configured to ascertain a semantic segmentation of a received one-dimensional or multidimensional data signal, and which includes a second machine learning system, which has been trained by:
  a) selecting a subset of data signals from a training set for the second machine learning system, which includes the data signals;
  b) deciding whether or not the data signals of the subset are to be manipulated;
  c) when the data signals are to be manipulated, ascertaining manipulated data signals as a function of the respective data signals and as a function of a data signal interference ascertained as follows:
    i) ascertaining a training data set that includes pairs of data signals and associated desired semantic segmentations; and
    ii) generating the data signal interference as a function of the data signals of the training data set, of the associated desired semantic segmentation, and of estimated semantic segmentations of the data signals of the training data set acted upon by the data signal interference,
  and replacing the data signals with the respective ascertained manipulated data signals;
  d) setting a desired output value to the value of a predefinable first numerical value if the data signals are not manipulated, or to a second predefinable numerical value differing from the first numerical value if the data signals are manipulated; and
  e) training the parameters of the second machine learning system with the subset of data signals and associated desired output values.

* * * * *